June 16, 1953  D. B. GRABLE ET AL  2,641,927
WELL PIPE VIBRATING APPARATUS
Filed Feb. 1, 1951
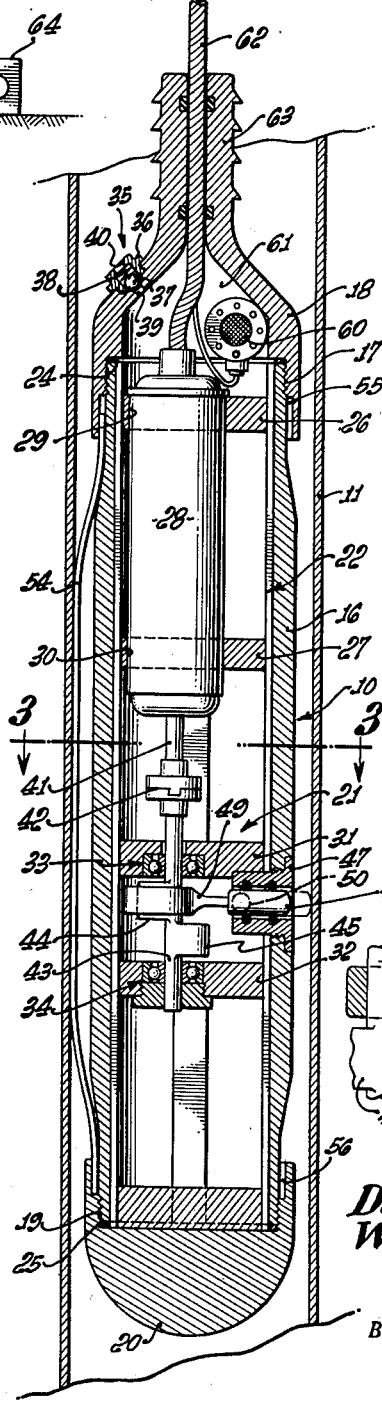
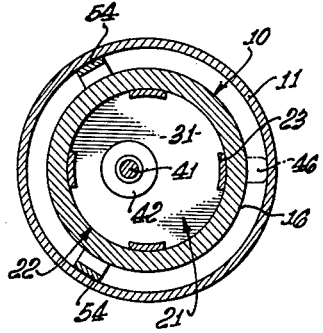
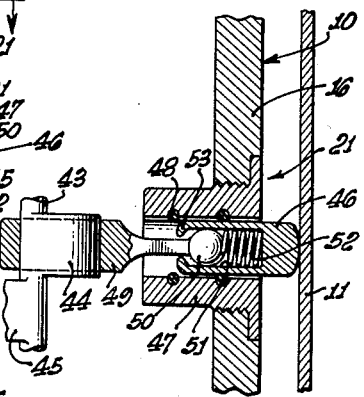
DONOVAN B. GRABLE,
WILLIAM A. VOCK,
INVENTORS
BY *H. Calvin White*
ATTORNEY.

Patented June 16, 1953

2,641,927

UNITED STATES PATENT OFFICE 2,641,927

WELL PIPE VIBRATING APPARATUS

Donovan B. Grable and William A. Vock,
Long Beach, Calif.

Application February 1, 1951, Serial No. 208,910

4 Claims. (Cl. 73—151)

This invention has to do generally with the exploration of conditions existing in oil wells, and particularly as they relate to the well pipe (which may be casing, tubing or drill pipe), and the presence, nature and conditions of materials at the outside of the pipe. Specifically, the invention relates to new apparatus employing the general principle of utilizing the energy created by application to the inside of the pipe of successive blows or vibrations, to serve any or all of various purposes, as will be developed below.

In certain of its aspects the invention is directed to the problems of determining the nature and conditions of materials directly at the outside of the pipe, for such objectives as to ascertain the location at which the pipe may be stuck in the well, or the locations at which different substances, e. g. sands, rock, cement or fluids may exist, or the same substance may exist at different degrees of compaction against the pipe. For example, a stuck condition of the pipe may result from a greater compaction of the formation against the pipe at a particular location, reducing therefore the freedom of the pipe for induced vibration at that location. Similarly, the susceptibility of the pipe to induced vibration at different locations may be affected by the physical nature and condition of different materials e. g. fluids, formation and currents, at those different locations.

In accordance with the invention, advantage is taken of the varying resonance characteristics of the pipe as affected by the conditions of its external confinement, to determine the nature and location of that confinement. Specifically contemplated is employment of a method and equipment operable to produce successive impacts against and along the pipe, and carrying a vibration responsive device for transmitting the vibrations or sounds resulting from the pipe vibration, to the ground surface by way of an electrical conductor. The apparatus may be run into the drill on any suitable support or string, e. g. a cable containing the conductor.

In a typical embodiment, the apparatus comprises a tubular body containing a motor-driven vibrator operable to transmit to the well pipe at one side of the body a succession of preferably high frequency impacts, the opposite side of the body being yieldably supported in spaced relation to the pipe as by the later described arrangement of springs. Provision is made for continuously picking up and transmitting the pipe vibrations by placing within a hermetically sealed chamber, desirably in the vibrator body, a vibration responsive device, such as a microphone, electrically connected to the conductor cables.

The various features and objects of the invention, as well as the details of a typical embodiment, will be explained more fully in the following detailed description of the accompanying drawing, in which:

Fig. 1 is a general view showing the vibrating apparatus run down in a well on a conductor cable;

Fig. 2 is a view showing the vibrating apparatus on enlarged scale and in vertical section;

Fig. 3 is a cross section on line 3—3 of Fig. 2, and

Fig. 4 is a fragmentary enlargement of the vibrating element and its motor-powered drive.

At the outset it is to be observed, as previously indicated, that the invention is adaptable to the determination of the resonant characteristics and conditions of various specific well pipes including casing, tubing and drill pipe. Merely as illustrative, the showing of Fig. 1 is taken to indicate the use of the vibrator and its electrical connections in determining the resonance characteristics typically of a string of casing, or at least a given length of the casing explored by corresponding movement of the vibrator through that length. It may be further mentioned that whereas with the casing 11 its external confinement or stuck condition may be due to the presence of such materials as rock formations, against less dense fluid or solid materials, or to confinement within cement. In the drawing, the strata 12, 13, 14 and 15 may be taken generally as illustrative of materials of varying densities or degrees of compaction against the casing. Where the pipe consists of tubing or drill string, its external confinement or stuck condition may be due to lodgment within the formation, or binding against casing or solid objects within the well.

The vibrator 10 is shown in Fig. 2 to comprise a tubular body 16, the upper end of which is threaded at 17 into a head 18, the lower end of the body being threaded at 19 into a bottom closure, typically of a bull nose plug 20. The body 16 contains a motor driven vibrator mechanism 21 supported within a carrier or frame 22 which may be of skeleton structure including a circular series of longitudinally extending ribs 23 terminally bearing against and confined between the head shoulder 24 and the bottom plug shoulder 25. The ribs are attached to an upper pair of transverse supports 26 and 27 carrying the motor 28 containing openings 29 and 30 which receive and position the motor in offset relation to the longitudinal axis of the body. Ribs 23 are also secured to a pair of lower supports 31 and 32 which carry the bearings 33 and 34 within which the motor driven shaft rotates, as will appear. The vibrator body may carry at a suitable location, as within the head 18 a pressure relief valve generally indicated at 35, shown typically as comprising a body 36 containing a ball check 37 and its seating spring 38, controlling the relief of pressure within the apparatus through openings 39 and 40.

The motor shaft 41 is connected to a self-alining coupling 42 with the vibrator drive shaft 43 journalled in bearings 33 and 34 and carrying an eccentric form of crank 44 and an oppositely disposed mass 45 to counterbalance the shaft. As particularly illustrated in Fig. 4, shaft 43 drives a vibrator element 46 engageable against the casing 11 and mounted for reciprocation within bearing 47 threaded into the body 16. Fluid leakage about the vibrating element into the body is prevented by appropriate seal means such as the O-rings 48. The drive from shaft 43 to the element 46 is transmitted by the connecting rod 49 within which the eccentric 44 is rotatable, the outer ball-shaped end 50 of the rod being received within bore 51 of element 46 and bearing against coil spring 52. Retraction of the connecting end out of the vibrating element is prevented by crimping inwardly the end of the latter as at 53.

The side of the body opposite the location of the vibrating element 46 is yieldably maintained in spaced relation to the casing 11, as by means of bowed springs 54 terminally received within recesses 55 and 56.

As previously mentioned the apparatus is built to include also a device responsive to vibrations created by the vibrating element 46 and adaptable for transmission of vibration-created energy to the ground surface. As illustrative of a suitable provision for a sound or vibrational energy pick-up, we have shown a microphone or vibration responsive pick-up device 60 mounted on support 26 and within chamber 61 on the head 18.

The apparatus is run into the well on a line or cable 62 extending through and packed off within the retriever neck 63 of the head, the cable containing appropriate electrical wiring running to the motor 28 and microphone 60, through which the motor may be energized and the microphone output transmitted to appropriate indicating or recording apparatus at the ground surface, conventionally indicated at 64.

In operation, the vibrator 10 is lowered within and to a depth of any particular extent of the well pipe to be investigated. Energizing then the motor 28 to reciprocate the vibrator element 46 at high frequency against the well pipe, the apparatus may be progressively raised or lowered within the pipe. As will be appreciated, the resonance characteristics of any particular location of the pipe and in response to energization by the vibrator element 46, may vary in accordance with the compaction of material, or the presence of varying density materials, about the pipe, and accordingly it follows that the sounds or resonant vibrations, whatever may be their frequency, transmitted from the pipe to the microphone or vibration pick-up 60, will vary accordingly. Therefore, by transmitting to the ground surface the microphone or pick-up output, and preferably continuously to appropriate indicating or recording equipment 64, simultaneously with movement of the apparatus 10 within the pipe, it becomes possible to determine in accordance with the varying frequencies of the energy transmitted to the ground surface, the physical characteristics and conditions of materials at different locations along the outside of the pipe.

In certain operations it may be desirable to subject the pipe string to a longitudinal tension simultaneously with its being vibrated, as for example when the vibration and resonance induced in the pipe may be effective in dislodging it from a stuck condition. Accordingly, throughout the time or travel of the apparatus while the pipe is being vibrated, or at such time as the energy transmitted to the ground surface indicates that the vibrator is operating at a location where the pipe may be lodged, an upward pull may be exerted on the pipe to a degree tending to loosen the pipe as it undergoes vibration.

In general the invention contemplates subjecting the pipe to longitudinal tension or compression, as by upward or downward movement of the pipe string at the ground surface, while creating in the string a vibrative or resonant condition, using the apparatus 10 in the manner explained. The resonance characteristics of the pipe, at least at all locations above the place at which it may be firmly stuck or lodged in the well, may be affected by subjecting the pipe to tension or compression strain, and such variability of the resonant qualitites or condition of the pipe may be utilized together with the vibration transmission to the ground surface, in more accurately determining the locations of compaction about the pipe.

It may be further observed that the invention affords an apparatus of determining not only the general location but also the length or vertical extent of the compaction about the pipe since the impedance to the pipe resonance will be coextensive with the exterior compaction. Not only is it possible to determine the presence and location of a single compaction about the pipe, but also the location and extent of any number of spaced compactions. Unlike previous expedients proposed for obtaining this kind of information, the present apparatus permits making all necessary determinations below the uppermost of locations where a compacted condition may exist.

We claim:

1. Apparatus adapted to be lowered on an electrically conductive line within a well pipe, comprising a tubular body, a motor in the body, a vibrator element driven by said motor and operable to engage and produce successive impacts against said pipe, and a vibration responsive device hermetically sealed in said apparatus and electrically connected to the line, said device being operable to receive and transmit through said line vibrational energy created in accordance with said impacts.

2. Apparatus adapted to be lowered on an electrically conductive line within a well pipe, comprising a tubular body, a motor in the body, a vibrator element driven by said motor and operable to engage and produce successive impacts against said pipe at one side of the body, yielding means carried by the apparatus and engageable with the pipe to support the opposite side of the body in spaced relation to the pipe, and a vibration responsive device hermetically sealed in said apparatus and electrically connected to the line, said device being operable to receive and transmit through said line vibrational energy created in accordance with said impacts.

3. Apparatus adapted to be lowered on an electrically conductive line within a well pipe, comprising a tubular body, a vibrator assembly contained within said body and including a motor electrically connected to said line, a shaft driven by the motor, a vibrator element extending through the side of the body and engageable against the well pipe to produce successive impacts against said pipe, means for driving said element from the shaft, and a vibration responsive device hermetically sealed in said body and electrically connected to the line, said device being operable to receive and transmit through said line vibrational energy created in accordance with said impacts.

4. Apparatus adapted to be lowered on an electrically conductive line within a well pipe, comprising a tubular body, and a vibrator assembly removably contained within the body, said assembly comprising a carrier structure, a motor electrically connected to said line, a shaft driven by the motor and supported by said carrier structure, a vibrating element extending through one side of the body and engageable against the well pipe to produce successive impacts against said pipe, a driving connection between said element and the shaft, and a vibration responsive device hermetically sealed in said body and electrically connected to said line, said device being operable to receive and transmit through said line vibrational energy created in accordance with said impacts.

DONOVAN B. GRABLE.
WILLIAM A. VOCK.

References Cited in the file of this patent

UNITED STATES PATENTS

| Number | Name | Date |
|---|---|---|
| 1,654,819 | Kinley | Jan. 3, 1928 |
| 2,261,564 | Robichaux | Nov. 9, 1941 |
| 2,340,959 | Harth | Feb. 8, 1944 |
| 2,396,935 | Walstrom | Mar. 19, 1946 |
| 2,436,047 | Martin | Feb. 17, 1948 |
| 2,530,308 | Martin | Nov. 14, 1950 |
| 2,530,309 | Martin | Nov. 14, 1950 |
| 2,550,964 | Brookes | May 1, 1951 |
| 2,565,279 | Tamborello | Aug. 21, 1951 |

FOREIGN PATENTS

| Number | Country | Date |
|---|---|---|
| 611,047 | France | June 26, 1926 |